(12) United States Patent
Cha

(10) Patent No.: US 12,456,173 B2
(45) Date of Patent: Oct. 28, 2025

(54) IMAGE PROCESSING DEVICE AND IMAGE PROCESSING METHOD

(71) Applicant: SK hynix Inc., Gyeonggi-do (KR)

(72) Inventor: Su Ram Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 423 days.

(21) Appl. No.: 18/070,696

(22) Filed: Nov. 29, 2022

(65) Prior Publication Data
US 2024/0020793 A1    Jan. 18, 2024

(30) Foreign Application Priority Data
Jul. 14, 2022    (KR) .................. 10-2022-0086997

(51) Int. Cl.
*G06T 5/70* (2024.01)
*G06T 5/20* (2006.01)
*G06T 7/246* (2017.01)

(52) U.S. Cl.
CPC .................. *G06T 5/70* (2024.01); *G06T 5/20* (2013.01); *G06T 7/246* (2017.01); *G06T 2207/20028* (2013.01)

(58) Field of Classification Search
CPC .. G06T 5/70; G06T 5/20; G06T 7/246; G06T 2207/20028; G06T 7/248; G06T 2207/20182; G06T 5/50; G06T 5/10; G06T 2207/10016; G06T 2207/20032; G06T 5/73; G06T 7/0002; G06T 7/20; H04N 25/60; H04N 25/50; H04N 5/144; H04N 5/145; H04N 25/21; H04N 25/213; H04N 9/646; H04N 23/6845; H04N 23/6812; H04N 23/6811; H04N 23/683; H04N 19/117; H04N 19/139; H04N 19/527;
(Continued)

(56) References Cited

U.S. PATENT DOCUMENTS 8,488,010 B2    7/2013 Voss et al.
8,565,311 B2 *  10/2013 Ohira ............... H04N 19/44
                                        375/240.21
(Continued)

OTHER PUBLICATIONS

Eric Dubois et al., Noise Reduction in Image Sequences Using Motion-Compensated Temporal Filtering, IEEE Transactions on Communications, vol. COM-32, No. 7, Jul. 1984, pp. 826-831, IEEE, U.S.A.

*Primary Examiner* — Jose L Couso
(74) *Attorney, Agent, or Firm* — IP & T GROUP LLP

(57) ABSTRACT

Provided herein may be an image processing device and an image processing method. The image processing device may include a motion manager configured to generate movement information of an image sensor based on pixel values of a first frame image received from the image sensor, pixel values of a second frame image received from the image sensor prior to the first frame image, and velocity information of an inertia sensor configured to sense a velocity of the image sensor, a similarity map generator configured to generate a similarity map indicating a weight of a noise removal filter based on the pixel values of the first frame image, and a noise remover configured to remove temporal and spatial noise based on pixel values of the first frame image to which the noise removal filter is applied based on the similarity map and pixel values of the second frame image.

18 Claims, 7 Drawing Sheets

(58) Field of Classification Search
CPC ........ H04N 19/86; H04N 23/81; G06V 20/48; G06V 10/74; G06V 10/75; G06V 10/761
See application file for complete search history.

(56) References Cited

U.S. PATENT DOCUMENTS

| | | | |
|---|---|---|---|
| 9,692,975 B2 | 6/2017 | Liu | |
| 2005/0128355 A1* | 6/2005 | Kang | H04N 5/208 348/E5.076 |
| 2007/0248332 A1* | 10/2007 | Yata | H04N 5/21 348/E5.077 |
| 2009/0059017 A1* | 3/2009 | Kurokawa | H04N 25/618 348/222.1 |
| 2009/0097773 A1* | 4/2009 | Nishi | G06T 5/73 382/264 |
| 2010/0188535 A1* | 7/2010 | Mitsuya | G06T 5/50 348/241 |
| 2011/0149163 A1* | 6/2011 | Nishi | G06T 5/73 348/E5.022 |
| 2014/0341480 A1* | 11/2014 | Hamada | H04N 5/21 382/264 |
| 2015/0002684 A1* | 1/2015 | Kuchiki | H04N 23/951 348/208.4 |
| 2018/0035058 A1* | 2/2018 | Thumpudi | G06T 5/73 |
| 2018/0288330 A1* | 10/2018 | Miyazawa | H04N 5/2621 |
| 2020/0372614 A1* | 11/2020 | Tran | G06T 5/60 |
| 2022/0270204 A1* | 8/2022 | Quan | G06T 3/14 |

\* cited by examiner

IMAGE PROCESSING DEVICE AND IMAGE PROCESSING METHOD

CROSS-REFERENCE TO RELATED APPLICATION

The present application claims priority under 35 U.S.C. § 119 (a) to Korean patent application number 10-2022-0086997, filed on Jul. 14, 2022, the entire disclosure of which is incorporated herein by reference.

BACKGROUND

1. Field of Invention

Various embodiments of the present disclosure generally relate to an image processing device, and more particularly to an image processing device and an image processing method.

2. Description of Related Art

Generally, image sensors may be classified into a charge coupled device (CCD) image sensor and a complementary metal oxide semiconductor (CMOS) image sensor. Recently, the CMOS image sensor, which has low manufacturing cost, has low power consumption, and facilitates integration with a peripheral circuit, has attracted attention.

An image sensor included in a smartphone, a tablet PC, or a digital camera may acquire image information of an external object by converting light reflected from the external object into an electrical signal. An image signal processing device may perform operations of converting an electrical signal acquired from the image sensor or improving image quality.

The image processing device may remove noise contained in an image. The image processing device may detect motion by comparing consecutive images with each other, and may remove noise in the images. When the image sensor is moved, the time required for detecting motion through a comparison between images may increase. There is required a new method of removing noise contained in an image while shortening a motion detection time.

SUMMARY

Various embodiments of the present disclosure are directed to an image processing device and an image processing method, which rapidly acquire motion information of an image sensor, determine comparison regions in respective images in consideration of the acquired information, and remove noise contained in the corresponding image based on the result of an operation performed on the comparison regions.

An embodiment of the present disclosure may provide for an image processing device. The image processing device may include a motion manager configured to generate movement information of an image sensor based on pixel values of a first frame image received from the image sensor, pixel values of a second frame image received from the image sensor prior to the first frame image, and velocity information of an inertia sensor configured to sense a velocity of the image sensor, a similarity map generator configured to generate a similarity map indicating a weight of a noise removal filter based on the pixel values of the first frame image, and a noise remover configured to remove temporal and spatial noises contained in the first frame image based on pixel values of the first frame image to which the noise removal filter is applied based on the similarity map and pixel values of the second frame image in which the movement information is reflected.

An embodiment of the present disclosure may provide for an image processing method. The image processing method may include generating movement information of an image sensor based on pixel values of a first frame image received from the image sensor, pixel values of a second frame image received from the image sensor prior to the first frame image, and velocity information of an inertia sensor included in the image sensor, generating a similarity map indicating a weight of a noise removal filter based on the pixel values of the first frame image, and removing temporal and spatial noises contained in the first frame image based on pixel values of the first frame image to which the noise removal filter is applied based on the similarity map and pixel values of the second frame image in which the movement information is reflected.

An embodiment of the present disclosure may provide for an image processing method. The image processing method may include generating movement information depending on a sum of absolute differences between corresponding pixel values of first and second regions of interest (ROIs) respectively within first and second images provided from a moving image sensor, removing a spatial noise from the target image based on a weight value representing difference between center and neighboring pixel values within the first region of interest, and removing a temporal noise from the target image by combining the second ROI and the first ROI within the spatial-noise-removed target image. The second image may be prior to the first image and temporal and spatial noises may be removed from the second image. The second ROI may be apart from a region corresponding to the first ROI by a movement amount of the image sensor between the first and second images.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Various embodiments of the present disclosure will now be described more fully hereinafter with reference to the accompanying drawings, in which preferred embodiments of the present disclosure are shown, so that those skilled in the art can easily practice the technical spirit of the present disclosure.

Figure 1:
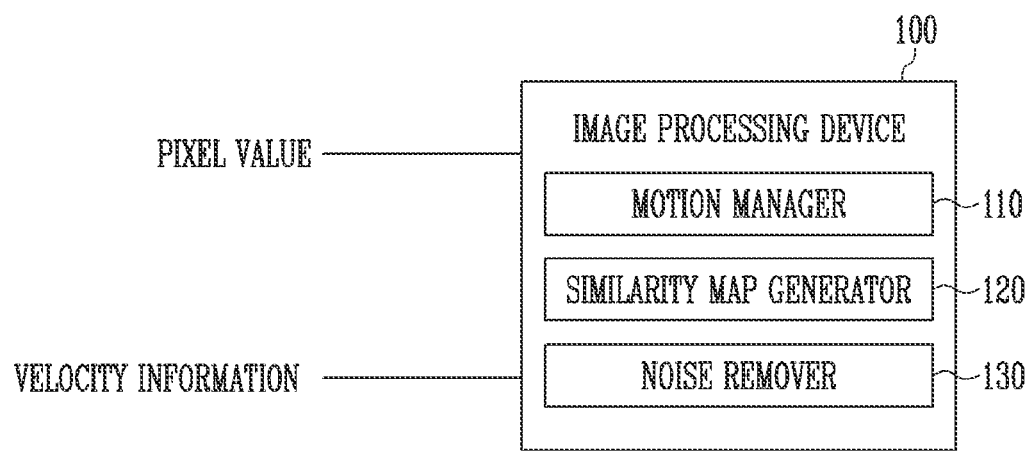
FIG. 1 is a diagram illustrating an image processing device according to an embodiment of the present disclosure.

FIG. 1 is a diagram illustrating an image processing device according to an embodiment of the present disclosure.

Referring to FIG. 1, an image processing device 100 may perform processing capable of improving the image quality of pixel data received from an image sensor, and may output processed image data. Here, processing may include electronic image stabilization (EIS), interpolation, tonal correction, image quality correction, size adjustment, etc.

The image processing device 100 may receive pixel values from the image sensor. The image processing device may receive velocity information (or velocity data) about the movement of the image sensor from an inertia sensor. The inertia sensor may be disposed in the image sensor. The velocity information of the inertia sensor may be information about the angular velocity or rotation speed of the inertia sensor in the motion (movement) direction of the image sensor.

In an embodiment of the present disclosure, the image processing device 100 may include a motion manager 110, a similarity map generator 120, and a noise remover 130. The image processing device 100 may remove temporal and spatial noises contained in an image in consideration of the movement of the image sensor.

The motion manager 110 may generate the movement information of the image sensor based on pixel values of a first frame image received from the image sensor, pixel values of a second frame image received from the image sensor prior to the first frame image, and the velocity information of the inertia sensor. The velocity information of the inertia sensor may include information about an angular velocity generated by the rotation of the inertia sensor with respect to an x axis, a y axis, and a z axis.

The motion manager 110 may calculate a first movement amount obtained by integrating the velocity information in a time domain. The motion manager 110 may calculate Euler's change from the angular velocity. The motion manager 110 may calculate the movement amount of the image sensor by integrating the Euler's change.

The motion manager 110 may generate the movement information of the image sensor based on the differences between pixel values of a first region of interest (ROI), set in the first frame image, and pixel values of a second region of interest (ROI), set in the second frame image. The motion manager 110 may move the second region of interest from a position, corresponding to the first region of interest, by the first movement amount in the second frame image.

In an embodiment of the present disclosure, the motion manager 110 may generate the movement information of the image sensor based only on the first movement amount when the sum of the absolute values of the differences (i.e., sum of absolute differences) between the pixel values of the first region of interest and the second region of interest is less than a preset reference value. Here, the motion manager 110 may accurately calculate the movement amount of the image sensor based on the velocity information of the inertia sensor.

The motion manager 110 may detect a second movement amount for which the sum of the absolute differences between the pixel values is minimized when the sum of the absolute differences between the pixel values is equal to or greater than the reference value. The motion manager 110 may generate the movement information of the image sensor based on the second movement amount. The motion manager 110 may correct the first movement amount based on the second movement amount.

The motion manager 110 may detect the second movement amount while moving the second region of interest within a first range. The motion manager 110 may determine the first range based on the first movement amount. In an embodiment of the present disclosure, the motion manager 110 may determine the first range to be a wide range as the first movement amount is larger.

The similarity map generator 120 may generate a similarity map, indicating a weight of a noise removal filter, based on the pixel values of the first frame image. In an embodiment of the present disclosure, the noise removal filter may be a bilateral filter. The similarity map generator 120 may determine the weight of the bilateral filter based on at least one of the difference between the pixel values of the first frame image and the position of the pixels in the first frame image.

The similarity map generator 120 may generate the similarity map based on the weight of the bilateral filter, which increases as the difference between the pixel values of a center pixel and neighboring pixels in the first region of interest is smaller. The similarity map generator 120 may generate the similarity map based on the weight of the bilateral filter, which increases as the positions of the center pixel and the neighboring pixels in the first region of interest are closer to each other.

The noise remover 130 may remove temporal and spatial noises contained in the first frame image based on the pixel values of the first frame image, to which the noise removal filter is applied based on the similarity map, and the pixel values of the second frame image in which the movement information of the image sensor is reflected. The noise remover 130 may remove spatial noise contained in the first frame image based on the similarity map. The noise remover 130 may remove temporal noise contained in the first frame image based on the movement information of the image sensor.

The noise remover 130 may calculate average values of the pixel values of the first frame image to which the bilateral filter is applied based on the similarity map and the pixel values of the second frame image that is moved in parallel based on the movement information of the image sensor. The noise remover 130 may generate a revised image for the first frame image based on the calculated average values.

In an embodiment of the present disclosure, the noise remover 130 may perform a noise removal operation of removing temporal noise by combining the first region of interest in the first frame image from which spatial noise is removed with the application of the bilateral filter, with the second region of interest in the second frame image. The noise remover 130 may move the second region of interest from the position corresponding to the first region of interest by the first movement amount or the second movement amount depending on the movement information of the image sensor.

In an embodiment of the present disclosure, the image processing device 100 may be included in an image processing system including both an image sensor and an inertia sensor. The inertia sensor may output velocity information related to the motion (movement) of the image sensor. The inertia sensor may be present inside or outside the image sensor.

The image processing system according to an embodiment of the present disclosure may store or display processed images or output the processed images to an external device. In an embodiment, the image processing system may be implemented in the form of a packaged module, a part or the like. In this case, the image processing system may be installed in a host. The host may be implemented as any of various types of electronic devices. For example, the host may be implemented as a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

The image sensor according to an embodiment of the present disclosure may be implemented as a charge coupled device (CCD) image sensor or a complementary metal oxide semiconductor (CMOS) image sensor. The image sensor may generate image data about an object that is input (or captured) through a lens.

The image sensor may include a plurality of pixels. The image sensor may generate a plurality of pixel values corresponding to a captured image from the plurality of pixels. The plurality of pixel values generated by the image sensor may be transmitted to the image processing device 100. That is, the image sensor may generate a plurality of pixel values corresponding to a single frame.

In an embodiment of the present disclosure, the image processing system may further include a memory. The memory may store a plurality of pixel values sensed in each frame. The memory may store filtered images, and may provide images required for a noise removal operation by the image processing device 100.

Figure 2:
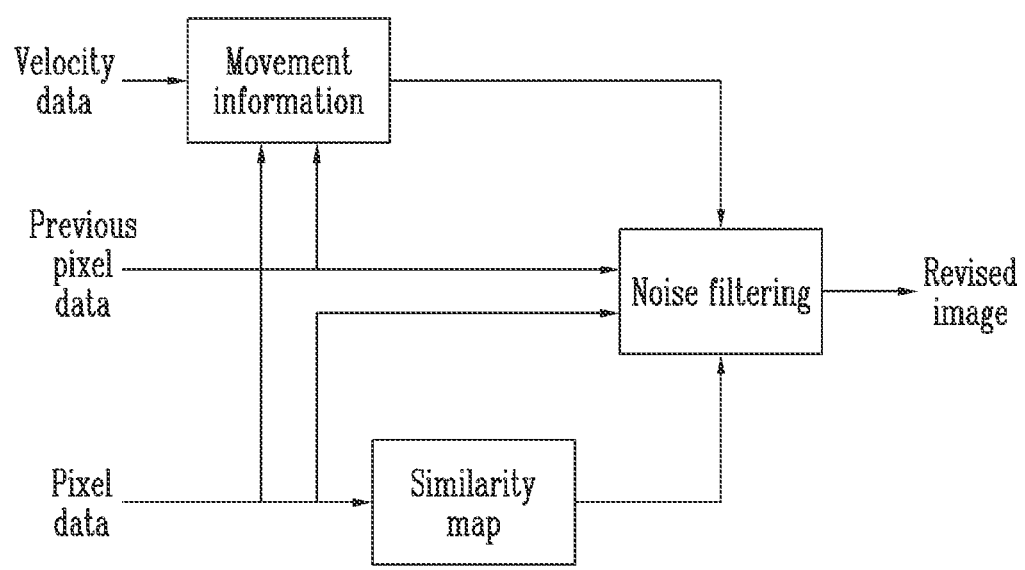
FIG. 2 is a diagram illustrating a temporal and spatial noises removal method according to an embodiment of the present disclosure.

FIG. 2 is a diagram illustrating a temporal and spatial noises removal method according to an embodiment of the present disclosure.

Referring to FIG. 2, an image processing device may remove temporal and spatial noises contained in a first frame image based on pixel values of the first frame image, pixel values of a second frame image, and velocity information of an inertia sensor. The image processing device may detect the movement (motion) of the image sensor, and may remove temporal noise contained in the corresponding image in consideration of the detected movement.

In FIG. 2, the velocity information may be received from the inertia sensor. Pixel data may indicate the pixel values of the first frame image. Previous pixel data may indicate the pixel values of the second frame image. The second frame image may be an image received from the image sensor prior to the first frame image. In an embodiment of the present disclosure, the first frame image and the second frame image may be consecutive frame images.

The motion manager may generate the movement information of the image sensor based on pixel values of a first frame image received from the image sensor, pixel values of a second frame image received from the image sensor prior to the first frame image, and the velocity information of the inertia sensor.

The motion manager may calculate a first movement amount indicating the movement of the image sensor using only the velocity information of the inertia sensor. The velocity information of the inertia sensor may include angular velocity information on each axis of a coordinate plane. The motion manager may calculate Euler's change based on the angular velocity information, and may calculate the first movement amount of the image sensor by integrating the Euler's change.

The motion manager may correct the first movement amount. In detail, the motion manager may calculate the sum of the absolute differences between the pixel values of a first region of interest and the pixel values of the second region of interest, which is moved from a position corresponding to the first region of interest by the first movement amount, in the second frame image. The motion manager may generate the movement information of the image sensor using only the first movement amount when the sum of the absolute differences between the pixel values is less than a preset reference value.

The motion manager may additionally use the pixel values of the first frame image and the pixel values of the second frame image to generate the movement information of the image sensor when the sum of the absolute differences between the pixel values is equal to or greater than the preset reference value.

The motion manager may move the second region of interest within the first range. The motion manager may calculate the sum of the absolute differences between the pixel values while moving the second region of interest within the first range. The motion manager may detect a position, at which the sum of the absolute differences between the pixel values of the first region of interest and the pixel values of the second region of interest is minimized, within the first range. The motion manager may detect a second movement amount indicating the amount of movement to the position at which the sum of the absolute differences between the pixel values is minimized. Based on the second movement amount, the motion manager may correct the movement information of the image sensor generated based on the first movement amount. In an embodiment of the present disclosure, the movement information of the image sensor may be generated based only on the first movement amount, or may be corrected based on the second movement amount.

The similarity map generator may determine the weight of a bilateral filter for spatial noise removal using only the pixel values of the first frame image. The similarity map generator may determine a similarity based on the differences between the pixel values of regions of interest within images, or the positions of the pixels thereof. In an embodiment of the present disclosure, as the difference between pixel values or the distance between the pixels is shorter, the similarity may be defined as being higher.

The similarity map generator may set a higher weight for pixels having a higher similarity therebetween. In an embodiment of the present disclosure, a Gaussian filter may be strongly applied to the pixels having a higher similarity therebetween. Because the influence of noise on a similarity in each pixel group is low, the Gaussian filter may be strongly applied to the pixel group, and thus noise may be removed from the corresponding pixel group. Because the similarity is low between pixels at a boundary, which is not noise, the Gaussian filter may be weakly applied to the boundary, and thus the boundary may be maintained in the corrected image.

In an embodiment of the present disclosure, the similarity map generator may generate the similarity map using the following equation.

$$SIM_{map}(i, j) = \frac{1}{w_n} \sum_{(i,j) \in ROI} e^{\frac{(I_{in}(t,i,j) - I_{in}(t,c_i,c_j))^2}{2\sigma_r^2}} e^{\frac{(c_i-i)^2 + (c_j-j)^2}{2\sigma_d^2}}$$

Here, $SIM_{map}(i,j)$ may be a similarity map having an N*N size at position (i, j), ROI may be a kernel for a region of interest having N*N size having a center position of $(c_i, c_j)$, $I_{in}(t,i,j)$ may be a pixel value at the position (i, j) in a frame captured at time t, $w_n$ may be a normalization factor, and $\sigma_r$ and $\sigma_d$ may indicate constants of the similarity map.

According to the above equation, the similarity map generator may assign greater weights to pixel values having smaller differences from the center pixel value in the corresponding region of interest. The similarity map generator may assign a greater weight to pixels closer to the center position in the corresponding region of interest.

The noise remover may remove temporal and spatial noises contained in the first frame image using the average values of the pixel values of the first frame image to which the noise removal filter is applied based on the similarity map, and the pixel values of the second frame image in which the movement information of the image sensor is reflected.

The noise remover may apply a bilateral filter to the pixel values of the first frame image based on the similarity map. As the bilateral filter is applied, spatial noise included in the pixel values of the first frame image may be removed.

The noise remover may move the second region of interest from the position corresponding to the first region of interest by the first movement amount or the second movement amount depending on the movement information of the image sensor. The noise remover may remove temporal noise by combining the first region of interest in the first frame image from which spatial noise is removed with the moved second region of interest in the second frame image. The noise remover may generate a revised image including the average values of the pixel values of the first region of interest and the second region of interest.

In an embodiment of the present disclosure, the noise-removed image may be stored in a memory. The image stored in the memory may be loaded to remove noise contained in a next frame image.

Figure 3:
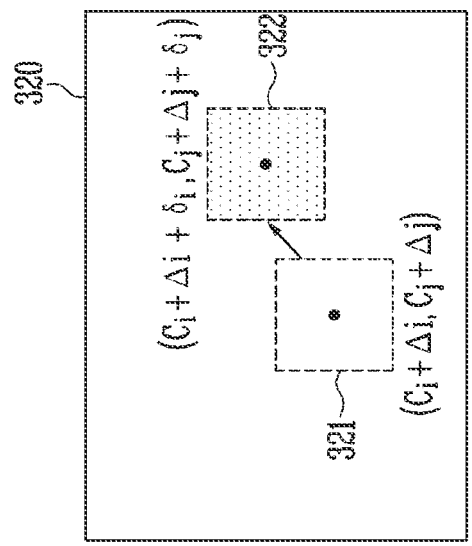
FIG. 3 is a diagram illustrating movement information of an image sensor according to an embodiment of the present disclosure.
Figure 3:
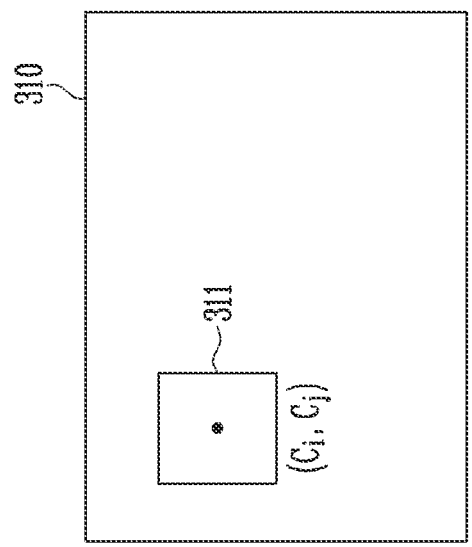

FIG. 3 is a diagram illustrating movement information of an image sensor according to an embodiment of the present disclosure.

Referring to FIG. 3, the motion manager may generate movement information of an image sensor. During image sensing, the image sensor may be moved. When the image sensor is moved, a similarity between pixels may be decreased. The quality of image may be improved only when the movement amount of the image sensor is taken into consideration during an image processing operation.

In FIG. 3, a first frame image 310 and a second frame image 320 may be illustrated. In the first frame image 310, a first region of interest 311 may be set. The position of a center pixel in the first region of interest 311 may be $(c_i, c_j)$.

The motion manager may calculate a first movement amount of the image sensor based on velocity information of an inertia sensor. The first movement amount may be a value obtained by integrating the Euler's change in the angular velocity of the inertia sensor in a time domain. In an embodiment of the present disclosure, the first movement amount may be represented by $(\Delta i, \Delta f)$.

A second region of interest 321, which is moved from the position $(c_i, c_j)$ corresponding to the position of the first region of interest 311 by the first movement amount $(\Delta i, \Delta f)$, may be set in the second frame image. The position of a center pixel in the second region of interest 321 may be represented by $(c_i + \Delta i, c_j + \Delta f)$.

The motion manager may calculate the first sum of the absolute values of the differences (i.e., first sum of absolute differences) between pixel values in the first region of interest 311 and the second region of interest 321, which is moved by the first movement amount $(\Delta i, \Delta f)$. The first sum of the absolute differences between the pixel values may be represented by the following equation:

$$SAD1 = \sum_{i,j \in ROI} |I_{out}(t-1, i, j) - I_{in}(t, i + \Delta i, j + \Delta f)|$$

Here, SAD1 may be the first sum of the absolute differences between pixel values, $I_{in}(t)$ may be the first frame image 310, and $I_{out}(t-1)$ may be the second frame image 320.

The motion manager may generate the movement information of the image sensor using only the first movement amount $(\Delta i, \Delta f)$ when the first sum of the absolute differences (SAD1) between pixel values is less than a preset reference value.

The motion manager may calculate the second sum of the absolute differences between pixel values while moving the second region of interest within the first range when the first sum of the absolute differences between pixel values is equal to or greater than the preset reference value, and may detect a corrected second region of interest 322 in which the second sum of the absolute differences between pixel values is minimized. In an embodiment of the present disclosure, the additional movement amount may be represented by $(\delta_i, \delta_j)$. The position of a center pixel in the corrected second region of interest 322 may be represented by $(c_i + \Delta i + \delta_i, c_j + \Delta j + \delta_j)$.

The second sum of the absolute differences between pixel values may be calculated using the following equation.

$$SAD2(\delta_i, \delta_j) = \sum_{i,j \in ROI} |I_{out}(t-1, i, j) - I_{in}(t, i + \Delta i + \delta_i, j + \Delta j + \delta_j)|$$

In FIG. 3, the second movement amount detected by the motion manager may be represented by $(\Delta i + \delta_i, \Delta j + \delta_j)$. Based on the second movement amount, the motion manager may correct the movement information of the image sensor generated based on the first movement amount. In an embodiment of the present disclosure, the movement information of the image sensor may be generated based on the first movement amount or the second movement amount. The motion manager may calculate the accurate movement amount of the image sensor.

In an embodiment of the present disclosure, the motion manager may set the first range. The motion manager may set the first range based on the first movement amount $(\Delta i, \Delta f)$. The motion manager may set the first range to a wider range as the first movement amount $(\Delta i, \Delta f)$ is larger. In an embodiment of the present disclosure, the first range may be a preset range. As the first range is wider, a computational load required for detecting the additional movement amount $(\delta_i, \delta_j)$ of the second region of interest 321 may be increased. To improve an image processing speed, the first range may be a fixed range.

Figure 4:
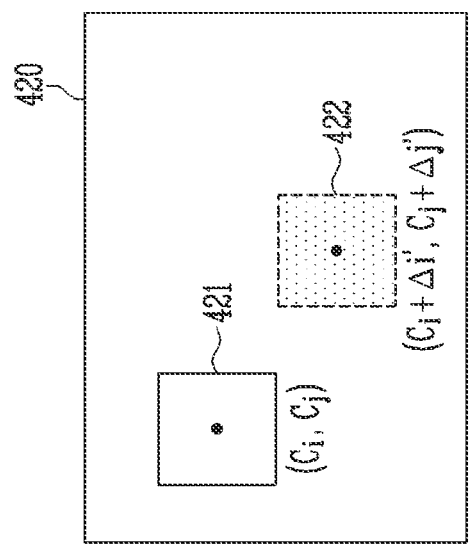
FIG. 4 is a diagram illustrating a temporal noise removal method according to an embodiment of the present disclosure.
Figure 4:
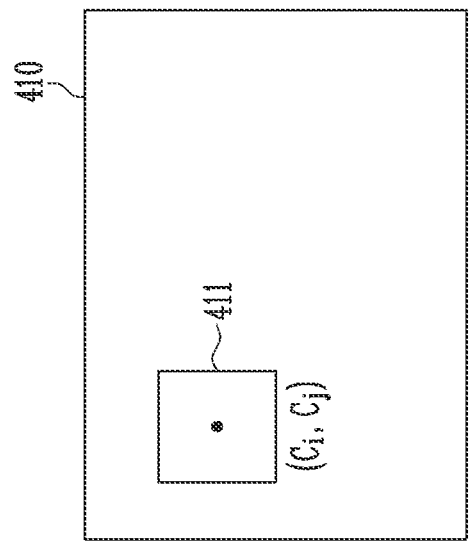

FIG. 4 is a diagram illustrating a temporal noise removal method according to an embodiment of the present disclosure.

Referring to FIG. 4, the noise remover may remove temporal and spatial noises contained in a first frame image 410 based on the first frame image 410 and a second frame image 420. The noise remover may remove temporal and spatial noises in consideration of the movement of the image sensor.

The first frame image 410 may include a first region of interest 411. The noise remover may remove spatial noise contained in the first frame image 410. The noise remover may apply a bilateral filter to the first region of interest 411. A coefficient for the bilateral filter may be determined based on the similarity between pixels. In an embodiment of the present disclosure, as the similarity between pixels is higher, the Gaussian filter may be strongly applied to the first region of interest. The similarity between the pixels may change depending on the difference between pixel values or the difference between the positions of the pixels.

In FIG. 4, the center pixel of the first region of interest 411 may be ($c_i$,$c_j$). As the differences between the pixel values of the center pixel ($c_i$,$c_j$) and the remaining pixels of the first region of interest 411 are smaller, weights to be applied to the remaining pixels may be increased. As the distances between the center pixel ($c_i$,$c_j$) and the remaining pixels of the first region of interest 411 are shorter, weights to be applied to the remaining pixels may be increased.

In an embodiment of the present disclosure, the value of the weight to be applied to the first region of interest 411 may reflect both the differences between pixel values and the distances between the pixels. For example, a weight greater than those of other pixels may be applied to pixels that have a smaller difference between the pixel values and are close to the center pixel ($c_i$,$c_j$). As the weight is greater, the Gaussian filter may be strongly applied. The pixels to which the Gaussian filter is applied may become similar to the neighboring pixels as the strength of the Gaussian filter is greater.

In an embodiment of the present disclosure, the first frame image may include a plurality of regions of interest. The noise remover may remove spatial noise by applying the bilateral filter to the plurality of regions of interest. The spatial noise may occur at the same position in different frames. The noise remover may remove the spatial noise by applying the bilateral filter.

In FIG. 4, the first frame image 410 may be an image to which the bilateral filter is applied based on the similarity map and from which the spatial noise is removed. The second frame image 420 may be an image from which temporal and spatial noises are removed. The second frame image 420 may be an image received from the image sensor prior to the first frame image 410. The second frame image 420 may be stored in a memory inside or outside the image processing device.

The noise remover may remove temporal noise by comparing the first frame image 410 with the second frame image 420. The temporal noise may be noise occurring at different positions in respective frames. The noise remover may remove the temporal noise by combining consecutive frame images with each other.

In an embodiment of the present disclosure, the noise remover may generate a revised image including the average values of the pixel values of the first region of interest 411 and the moved second region of interest 422. The second frame image 420 may include a second region of interest 421 corresponding to the position of the first region of interest 411. When the image sensor is not moved, a revised image may be generated by combining the first region of interest 411 with the second region of interest 421.

In accordance with the movement of the image sensor, the noise remover may move the second region of interest based on the movement information of the image sensor. The position of a center pixel in the moved second region of interest may be represented by ($c_i$+$\Delta i'$,$c_j$+$\Delta j'$). The motion manager may calculate the movement amount ($\Delta i'$,$\Delta j'$) of the second region of interest. The movement amount ($\Delta i'$,$\Delta j'$) may be the movement amount ($\Delta i$,$\Delta j$) calculated by the inertia sensor, or the sum ($\Delta i$+$\delta_i$,$\Delta j$+$\delta_j$) of the movement amount ($\Delta i$,$\Delta j$) calculated by the inertia sensor and the additional movement amount ($\delta_i$,$\delta_j$) for which the sum of the absolute differences between pixel values of the regions of interest is minimized. The movement amount ($\Delta i'$,$\Delta j'$) of the second region of interest calculated by the motion manager may correspond to the description of FIG. 3.

The noise remover may generate a revised image by combining the first region of interest 411 having the center pixel of ($c_i$, $c_j$) with the second region of interest 422 having the center pixel of ($c_i$+$\Delta i'$,$c_j$+$\Delta j'$). The noise remover may generate the revised image using the following equation.

$$I_{out}(t, c_i, c_j) = \frac{\left\{\sum_{i=\frac{N}{2}}^{\frac{N}{2}} \sum_{j=\frac{N}{2}}^{\frac{N}{2}} SIM_{map}(i, j)I(t, c_i + i, c_j + j)\right\} + I_{out}(t-1, c_i + \Delta i', c_j + \Delta j')}{2}$$

The noise remover may calculate the average values of the pixel values of the first region of interest 411 to which the bilateral filter is applied and the pixel values of the second region of interest 422 moved based on the movement information of the image sensor, and may generate a revised image including the average values.

Figure 5:
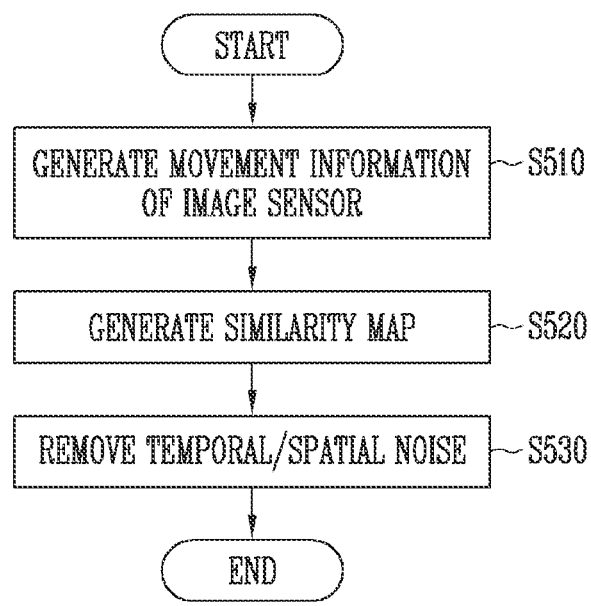
FIG. 5 is a flowchart illustrating a temporal and spatial noises removal method according to an embodiment of the present disclosure.

FIG. 5 is a flowchart illustrating a temporal and spatial noises removal method according to an embodiment of the present disclosure.

Referring to FIG. 5, an image processing device may remove temporal and spatial noises contained in a sensed image in consideration of the movement of an image sensor. The image processing device may calculate movement information related to the movement of the image sensor rather than comparing all frame images with each other to detect the movement of the image sensor.

At operation S510, a motion manager may generate the movement information of the image sensor based on pixel values of a first frame image received from the image sensor, pixel values of a second frame image received from the image sensor prior to the first frame image, and the velocity information of an inertia sensor. The motion manager may calculate a movement amount of the image sensor based on velocity information of the inertia sensor. The motion manager may correct the movement amount of the image sensor calculated based on received pixel values.

At operation S520, a similarity map generator may generate a similarity map, indicating the weight of a noise removal filter, based on the pixel values of the first frame image. The similarity map generator may determine the weight based on at least one of the difference between the pixel values of the first frame image and the position of the pixels in the first frame image. In an embodiment of the present disclosure, the noise removal filter may be a bilateral filter.

The similarity map generator may increase the weight as the difference between the pixel values of a center pixel and neighboring pixels in the first region of interest is smaller. The similarity map generator may increase the weight as the positions of the center pixel and neighboring pixels in the first region of interest are closer to each other.

At operation S530, the noise remover may remove temporal and spatial noises contained in the first frame image based on the pixel values of the first frame image to which the noise removal filter is applied based on the similarity map, and the pixel values of the second frame image in which the movement information of the image sensor is reflected. The noise remover may remove spatial noise by applying a bilateral filter to the first frame image based on the similarity map. The noise remover may remove temporal noise by combining the first frame image with the second frame image, which is moved in parallel depending on the movement information of the image sensor.

Respective operations in FIG. 5 may correspond to descriptions of FIGS. 1 to 4.

Figure 6:
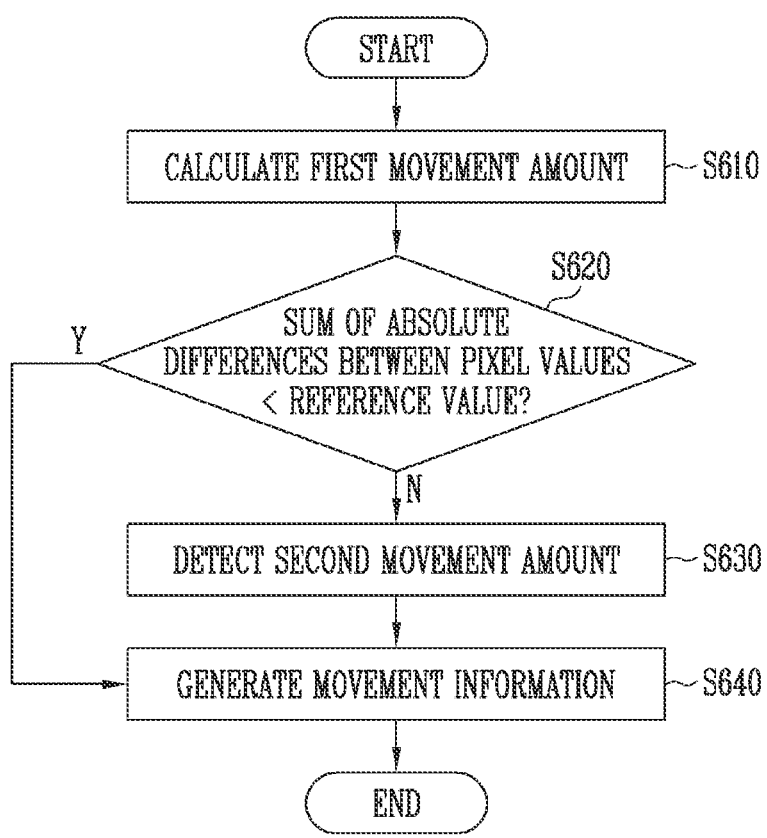
FIG. 6 is a flowchart illustrating a method of generating movement information of an image sensor according to an embodiment of the present disclosure.

FIG. 6 is a flowchart illustrating a method of generating movement information of an image sensor according to an embodiment of the present disclosure.

Referring to FIG. 6, a motion manager may calculate movement amount of the image sensor. The motion manager may correct the movement amount of the image sensor, calculated based on velocity information of an inertia sensor, depending on pixel values.

At operation S610, the motion manager may receive the velocity information of the inertia sensor, and may calculate a first movement amount of the image sensor based on the received velocity information. The velocity information of the inertia sensor may be information about angular velocity of the inertia sensor. The motion manager may calculate Euler's change based on the information about the angular velocity, and may calculate the first movement amount by integrating the calculated Euler's change in a time domain.

The motion manager may calculate the first movement amount without comparing the pixel values of consecutive frame images with each other. The motion manager may reduce a computational load required for detecting the movement amount of the image sensor by calculating the first movement amount of the image sensor based on the velocity information of the inertia sensor.

At operation S620, the motion manager may calculate the sum of the absolute differences between the pixel values of a first region of interest within a first frame image and a second region of interest within a second frame image. The motion manager may move the second region of interest from a position corresponding to the first region of interest by the first movement amount. The motion manager may compare the sum of the absolute differences (SAD) between the pixel values of the first region of interest and the second region of interest with a preset reference value.

At operation S630, the motion manager may detect a second movement amount in which the sum of the absolute differences between the pixel values is minimized when the sum of the absolute differences between the pixel values is equal to or greater than the preset reference value. The motion manager may calculate the sum of the absolute differences between the pixel values while moving the second region of interest within a first range. The first range may be a range that changes depending on the first movement amount or that is preset.

At operation S640, the motion manager may generate movement information of the image sensor based on the first movement amount or the second movement amount. The motion manager may generate movement information of the image sensor including the first movement amount when the sum of the absolute differences between the pixel values of the first region of interest and the second region of interest is less than the preset reference value. In an embodiment of the present disclosure, when the sum of the absolute differences between the pixel values of the first region of interest and the second region of interest is less than the preset reference value, based on the second movement amount, the motion manager may correct the movement information of the image sensor generated based on the first movement amount. The motion manager may accurately detect the movement amount of the image sensor.

Respective operations in FIG. 6 may correspond to the descriptions of FIG. 3.

Figure 7:
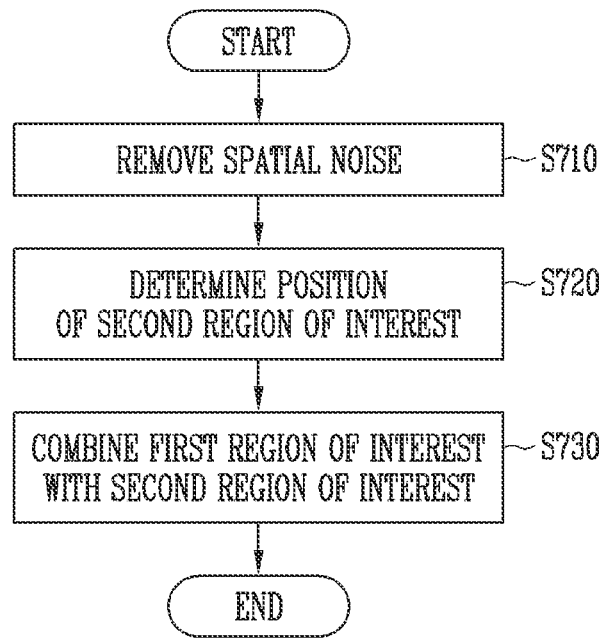
FIG. 7 is a flowchart illustrating a method of generating a revised image according to an embodiment of the present disclosure.

FIG. 7 is a flowchart illustrating a method of generating a revised image according to an embodiment of the present disclosure.

Referring to FIG. 7, the noise remover may remove temporal and spatial noises contained in a first frame image and generate a revised image.

The noise remover may remove temporal and spatial noises in consideration of the movement of the image sensor.

At operation S710, the noise remover may remove spatial noise contained in the first frame image based on pixel values of the first frame image. The noise remover may apply a bilateral filter to the first frame image. The noise remover may change the strength of a Gaussian filter to be applied depending on a similarity between images to which the bilateral filter is to be applied. The noise remover may generate the first frame image from which spatial noise is removed.

At operation S720, the noise remover may determine the position of a second region of interest in a second frame image to be combined with the first region of interest in the first frame image. The noise remover may set the position of the second region of interest based on the movement information of the image sensor. The noise remover may move the second region of interest by the first movement amount or the second movement amount depending on the movement information of the image sensor.

At operation S730, the noise remover may combine the first region of interest in the first frame image from which spatial noise is removed with the moved second region of interest in the second frame image. The noise remover may generate a revised image in which the first region of interest is combined with the second region of interest. The noise remover may generate a revised image including the average values of the pixel values of the first region of interest and the pixel values of the second region of interest.

In an embodiment of the present disclosure, the noise remover may calculate a weighted sum of the pixel values of the first region of interest and the pixel values of the second region of interest. The noise remover may calculate a weighted sum of the pixel values of the first frame image and the pixel values of a plurality of images. The noise remover may assign a higher weight to an image that is more recently generated.

Figure 8:
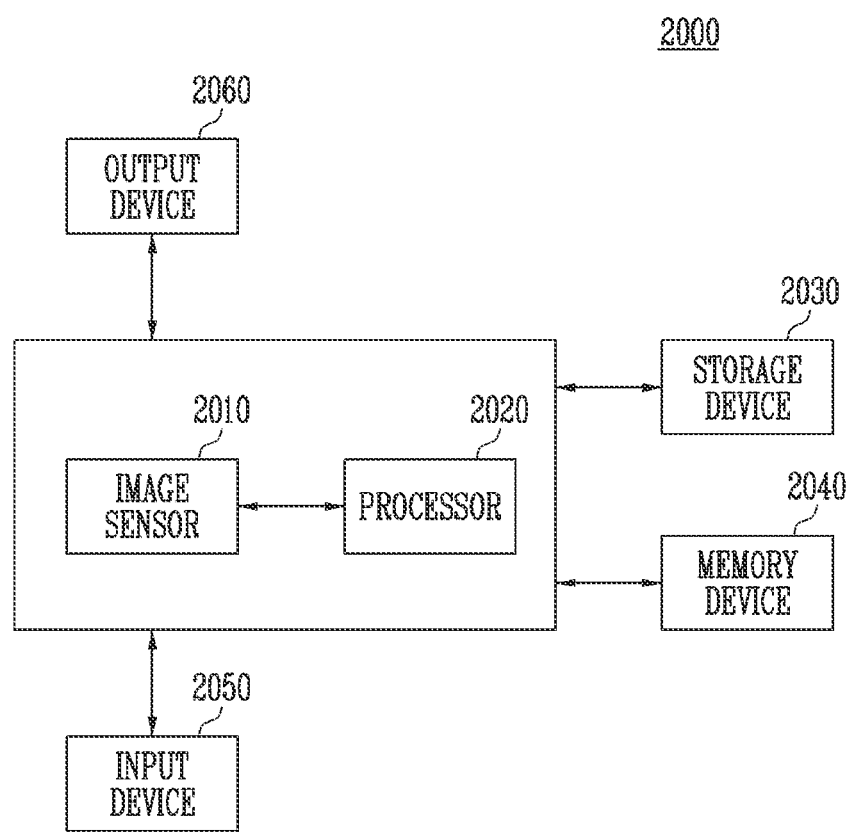
FIG. 8 is a block diagram illustrating an electronic device including an image processing device according to an embodiment of the present disclosure.

FIG. 8 is a block diagram illustrating an electronic device including an image processing device according to an embodiment of the present disclosure.

Referring to FIG. 8, an electronic device 2000 may include an image sensor 2010, a processor 2020, a storage device 2030, a memory device 2040, an input device 2050, and an output device 2060. Although not illustrated in FIG. 8, the electronic device 2000 may further include ports which are capable of communicating with a video card, a sound card, a memory card, or a USB device, or communicate with other electronic devices.

The image sensor 2010 may generate image data corresponding to incident light. The output device 2060 may display the image data. The storage device 2030 may store the image data. The processor 2020 may control the operations of the image sensor 2010, the storage device 2030, and the output device 2060.

In an embodiment of the present disclosure, the image sensor 2010 may include an inertia sensor for sensing the motion (movement) of the image sensor 2010. The inertia sensor may output velocity information about an angular velocity or a rotation speed in a movement direction.

The processor 2020 may perform specific calculations or tasks. The processor 2020 may execute and control the operation of the electronic device 2000. In accordance with an embodiment of the present disclosure, the processor 2020 may be a microprocessor, a central processing unit (CPU), or an application processor (AP). The processor 2020 may be coupled to the storage device 2030, the memory device 2040, the input device 2050, and the output device 2060 through an address bus, a control bus, and a data bus, and may then communicate with the devices. In accordance with an embodiment of the present disclosure, the processor 2020 may also be coupled to an expansion bus such as a peripheral component interconnect (PCI) bus.

In an embodiment of the present disclosure, the processor 2020 may generate motion information of the image sensor 2010 based on velocity information of an inertia sensor. The processor 2020 may correct the movement information of the image sensor based on pixel values. The corrected movement information may accurately represent the movement of the image sensor.

The processor 2020 may determine the weight of a bilateral filter for removing spatial noise based on the pixel values. The processor 2020 may generate a revised image from which temporal and spatial noises are removed by combining pixel values of a current frame image to which the bilateral filter is applied with pixel values of a previous frame image in which the movement information of the image sensor is reflected.

The storage device 2030 may include all types of nonvolatile memory devices including a flash memory device, a solid state drive (SSD), a hard disk drive (HDD), and a CD-ROM.

The memory device 2040 may store data required for the operation of the electronic device 2000. For example, the memory device 2040 may include a volatile memory device such as a Dynamic Random Access Memory (DRAM) or a Static Random Access Memory (SRAM), and a nonvolatile memory device such as an Erasable Programmable Read-Only Memory (EPROM), an Electrically Erasable Programmable Read-Only Memory (EEPROM), or a flash memory device. The processor 2020 may control the image sensor 2010 and the output device 2060 by executing an instruction set stored in the memory device 2040.

The input device 2050 may include an input means such as a keyboard, a keypad, or a mouse. The output device 2060 may include an output means such as a printer or a display.

The image sensor 2010 may be coupled to the processor 2020 through the buses or other communication links to perform communication.

The image sensor 2010 may be implemented as various types of packages. For example, at least some components of the image sensor 2010 may be implemented using any of packages such as package on package (POP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

In accordance with an embodiment, the image sensor 2010 and the processor 2020 may be integrated into a single chip, or may be integrated into different chips, respectively.

Moreover, the electronic device 2000 should be construed as any of all computing systems using the image sensor 2010. For example, the electronic device 2000 may include a digital camera, a mobile phone, a personal digital assistant (PDA), a portable multimedia player (PMP), a smartphone, etc.

According to the present disclosure, there can be provided an image processing device, which may rapidly acquire movement information of an image sensor, and may remove noise in consideration of movement of the image sensor.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure. Furthermore, the embodiments may be combined to form additional embodiments.

What is claimed is:

1. An image processing device comprising:
a motion manager configured to generate movement information of an image sensor based on pixel values of a first frame image received from the image sensor, pixel values of a second frame image received from the image sensor prior to the first frame image, and velocity information of an inertia sensor configured to sense a velocity of the image sensor;
a similarity map generator configured to generate a similarity map indicating a weight of a noise removal filter based on the pixel values of the first frame image; and
a noise remover configured to remove temporal and spatial noises contained in the first frame image based on pixel values of the first frame image, to which the noise removal filter is applied based on the similarity map, and pixel values of the second frame image in which the movement information is reflected,
wherein the motion manager:
calculates a first movement amount by integrating the velocity information in a time domain; and
generates the movement information based on whether a sum of absolute differences between pixel values of a first region of interest (ROI) within the first frame image and pixel values of a second ROI within the second frame image is less than a preset reference value, and
wherein a position of the second ROI is moved from a position corresponding to the first ROI by the first movement amount.

2. The image processing device according to claim 1, wherein the motion manager generates the movement information based on the first movement amount when the sum is less than the preset reference value.

3. The image processing device according to claim 2, wherein the motion manager configures to:

determine a second movement amount, for which the sum is minimized by moving the second ROI within a first range when the sum is equal to or greater than the preset reference value, and generate the movement information based on the second movement amount.

4. The image processing device according to claim 3, wherein the first range depends on the first movement amount.

5. The image processing device according to claim 4, wherein the first range becomes wider as the first movement amount is greater.

6. The image processing device according to claim 3, wherein the noise removal filter is a bilateral filter, and wherein the similarity map generator determines the weight based on at least one of a position of pixels in the first frame image and difference between the pixel values of the first frame image.

7. The image processing device according to claim 6, wherein the similarity map generator generates the similarity map based on a weight that increases as the difference between pixel values of a center pixel and neighboring pixels in the first ROI becomes smaller.

8. The image processing device according to claim 7, wherein the similarity map generator generates the similarity map based on a weight that increases as positions of the center pixel and the neighboring pixels in the first ROI are closer to each other.

9. The image processing device according to claim 6, wherein the noise remover removes the spatial noise contained in the first frame image based on the similarity map, and removes the temporal noise contained in the first frame image based on the movement information.

10. The image processing device according to claim 9, wherein the noise remover calculates average values of pixel values of the first frame image to which the bilateral filter is applied based on the similarity map and pixel values of the second frame image that is moved in parallel based on the movement information, and generates a revised image for the first frame image based on the average values.

11. The image processing device according to claim 10, wherein the noise remover removes the temporal noise by combining the second ROI with the first ROI in the first frame image, from which the spatial noise is removed, and wherein the second ROI is moved from a position corresponding to the first ROI by the first movement amount or the second movement amount.

12. An image processing method, comprising:

generating movement information of an image sensor based on pixel values of a first frame image received from the image sensor, pixel values of a second frame image received from the image sensor prior to the first frame image, and velocity information of an inertia sensor included in the image sensor;

generating a similarity map indicating a weight of a noise removal filter based on the pixel values of the first frame image; and removing temporal and spatial noises contained in the first frame image based on pixel values of the first frame image, to which the noise removal filter is applied based on the similarity map and pixel values of the second frame image in which the movement information is reflected, wherein the generating the movement information comprises:

calculating a first movement amount by integrating the velocity information in a time domain;

moving a second ROI within the second frame image from a position corresponding to a first ROI within the first frame image by the first movement amount; and calculating a sum of absolute differences between pixel values of the first ROI and pixel values of the second ROI.

13. The image processing method according to claim 12, wherein the generating the movement information further comprises generating the movement information based on the first movement amount when the sum is less than a preset reference value.

14. The image processing method according to claim 12, wherein the generating the movement information further comprises:

detecting a second movement amount, for which the sum is minimized when the sum is equal to or greater than the preset reference value; and generating the movement information based on the second movement amount.

15. The image processing method according to claim 14, wherein the noise removal filter is a bilateral filter, and wherein the generating the similarity map comprises determining the weight based on at least one of a position of pixels in the first frame image and a difference between the pixel values of the first frame image.

16. The image processing method according to claim 15, wherein the determining the weight comprises:

increasing the weight as the difference between pixel values of a center pixel and neighboring pixels in a first ROI is smaller; and increasing the weight as positions of the center pixel and the neighboring pixels in the first ROI are closer to each other.

17. The image processing method according to claim 15, wherein the removing the temporal and spatial noises comprises:

removing the spatial noise contained in the first frame image by applying the bilateral filter to the first frame image based on the similarity map; and removing the temporal noise contained in the first frame image by combining a first ROI within the first frame image, from which the spatial noise is removed, and a second ROI within the second frame image that is moved in parallel based on the movement information.

18. The image processing method according to claim 17, wherein removing the temporal noise comprises:

moving the second ROI by the second movement amount; and generating a revised image for the first frame image, the revised image including average values of pixel values of the first ROI from which the spatial noise is removed and pixel values of the moved second ROI.

* * * * *